United States Patent [19]
Tong

[11] Patent Number: 5,511,810
[45] Date of Patent: Apr. 30, 1996

[54] HAND DRIVING DEVICE FOR A BICYCLE

[76] Inventor: Kun-Yuan Tong, 2308 W. Doublegate Dr., Albany, Ga. 31707

[21] Appl. No.: 326,526

[22] Filed: Oct. 20, 1994

[51] Int. Cl.$^6$ .................................................. B62M 1/12
[52] U.S. Cl. ........................................ 280/233; 280/247
[58] Field of Search .................................... 280/230, 233, 280/234, 235, 242.1, 244, 247, 288.4

[56] References Cited

U.S. PATENT DOCUMENTS

| | | | |
|---|---|---|---|
| 571,051 | 11/1896 | Pettinati | 280/233 |
| 614,146 | 11/1898 | Vonhausen | 280/234 |
| 664,231 | 12/1900 | Andreen | 280/233 |
| 3,913,945 | 10/1975 | Clark | 280/233 |
| 4,733,880 | 3/1988 | Wilhelm, III | 280/233 |
| 4,925,200 | 5/1990 | Jones | 280/233 |
| 5,002,298 | 3/1991 | Motto | 280/233 |
| 5,282,640 | 2/1994 | Lindsey | 280/233 X |
| 5,372,374 | 12/1994 | Hudson | 280/233 |

FOREIGN PATENT DOCUMENTS

| | | | |
|---|---|---|---|
| 0658967 | 6/1929 | France | 280/233 |
| 0694365 | 12/1930 | France | 280/233 |
| 0072450 | 9/1892 | Germany | 280/233 |
| 4040883 | 6/1992 | Germany | 280/233 |
| 282046 | 1/1931 | Italy | 280/233 |
| 0008247 | 2/1896 | United Kingdom | 280/233 |
| 0022971 | 4/1903 | United Kingdom | 280/233 |
| 295590 | 2/1929 | United Kingdom | 280/233 |

*Primary Examiner*—Kevin T. Hurley
*Attorney, Agent, or Firm*—Hopkins & Thomas

[57] ABSTRACT

A hand driving device for a bicycle, the bicycle having a frame including an inclined frame member and a steering head. The hand driving device has a pair of spaced apart hand levers pivotally connected to a pair of pivoted levers, which are in turn pivotally connected to a pair of pedal connecting rods. Each pedal connecting rod is pivotally supported on the axle of a bicycle pedal. A pedal connecting rod fastener is passed over and along each pedal connecting rod toward the end of the pedal connecting rod for enclosing the axle of the bicycle pedal in an arcuate notch defined the end of the rod. The pivoted levers of the hand driving device are each pivotally connected to a T-shaped bracket, the T-shaped bracket in turn being connected to a pair of fastening plates mounted on the inclined frame member and steering head of the bicycle frame.

10 Claims, 2 Drawing Sheets

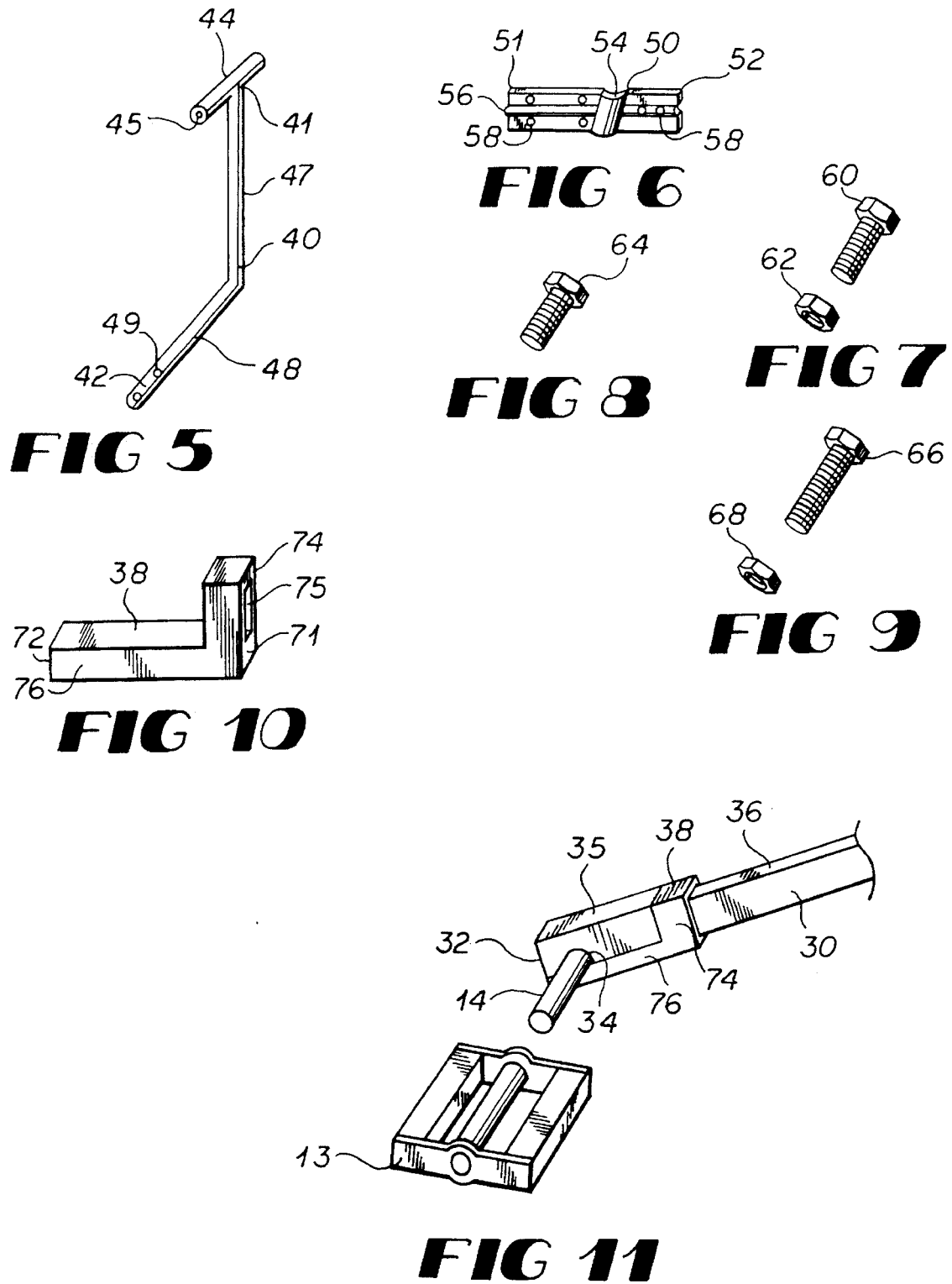

HAND DRIVING DEVICE FOR A BICYCLE

FIELD OF THE INVENTION

This invention relates in general to bicycles. More particularly, this invention relates to a removable hand driving device for a bicycle.

BACKGROUND OF THE INVENTION

Increasing numbers of Americans are riding bicycles on a daily basis. Some people are riding bicycles for their health, others are riding to help reduce air pollution and improve the environment. Regardless of the reason for bicycling, however, it is the bicycle rider's legs and lower body which are active and do all the work while the person is riding the bike. This can have the result that the person peddling the bicycle will become fatigued, and will only exercise their legs rather than their entire body while bicycling. Also, at times, both foot power and hand power would be useful in traveling uphill.

Bicycles having a hand driving apparatus are known in the art. One of the earliest of these patents is disclosed in U.S. Pat. No. 571,051 to Pettinati issued on Nov. 10, 1896. In Pettinati an auxiliary handlebar is provided which pivots about a point attached to the frame of the bicycle, and is connected through a lever to the crank of the bicycle, permitting the bicycle rider to power the bicycle with their legs and arms.

Another early approach to hand powering a bicycle is disclosed in French Patent No. 658,967 to Ferri issued on Jun. 22, 1929. Ferri teaches a bicycle having a pair of handle levers pivotally mounted on a bicycle frame, and connected by a second lever to the pedals of the bicycle to augment the bicycle rider's use of his or her legs for powering the bicycle. However, and unlike Pettinati, the patent to Ferri teaches a bicycle in which the hand driving device serves as a substitute for the bicycle handlebars.

Another early hand powered bicycle is disclosed in British Patent No. 8247 to Horton. In Horton a bicycle is disclosed which has a pair of handle bars and a hand powered assembly attached to the frame and the pedals of the bicycle. However, and like the patents to Pettinati and Ferri, the invention of Horton cannot be removed from the bicycle without the removal of the pedals or other portions of the bicycle so that the bicycle can be ridden without the hand powered device.

A common problem in the prior art is that when the hand power device or assembly has been attached to the bicycle, the device will continue to operate and the levers will be moved with the movement of the bicycle's pedals or bicycle's crank during travel. Thus, the hand power assembly of the bicycle will continue to move requiring additional leg power from the bicycle rider to move both the bicycle and the hand powered assembly when it is not being used. Also, the prior art hand powered bicycles leave the hand powered assembly in the bicycle rider's way when it is not being used, thus obstructing rather than supplementing the bicycle riding process.

Hence, a hand driving device for a bicycle is needed which can be quickly installed on a conventional bicycle, and quickly and easily removed from the bicycle so that if the bicycle rider does not wish to exercise his arms, or augment his pedaling efforts with arm or hand power, the assembly can be removed from the bicycle.

SUMMARY OF THE INVENTION

The invention disclosed in this application overcomes the problems of the prior art by providing a mechanism which can be quickly and easily fit or retrofit to any new or existing bicycle, and which can be quickly and easily removed when it is desired to power the bicycle through the use of bicycle rider's legs only.

The present invention includes a pair of levers including two handle levers pivotally attached to the upper ends of a pair of centrally pivoted levers. The lower ends of the pivoted levers are pivotally attached to a pair of pedal connecting rods, the ends of which are removably and pivotally supported on the axles of the bicycle's foot pedals. The pair of levers are pivotally fixed in position with respect to the bicycle by a removable T-shaped bracket, clamped by its upstanding stem to the frame of the bicycle. The ends of the pedal connecting rods are provided with a notched portion to be placed over the axial shaft of each bicycle pedal, and a stop is formed at the end of each pedal connecting rod for holding a pedal connecting rod fastener in position.

The pedal connecting rod fastener is slid over the pedal connecting rod and travels down toward the stop and is held in position by the stop while enclosing the bottom of the notch defined in the pedal connecting rod for securing the pedal connecting rod to the bicycle pedal's axial shaft. Upstanding handles on the ends of the handle levers enable the rider to manipulate the levers selectively by hand and arm motion to both power the device and steer the bicycle.

By constructing the hand driving device for a bicycle in this manner, the hand driving device can be quickly attached to a bicycle by placing the notches in the pedal connecting rods over the axial shafts of the bicycle pedals, sliding the pedal connecting rod fastener downward to the stop on the pedal connecting rod, while two fastening plates hold the T-shaped bracket to the frame and steering head of the bicycle frame. Thereafter, the bicycle can be used and propelled by both leg power and hand power. When and if it is desired to remove the hand driving device from the bicycle, the pedal level fasteners are slid forward, the pedal connecting rods are removed from the bicycle pedal axles, and the T-shaped bracket of the assembly can either be detached from the fastening plates, or the fastening plates themselves can be removed from the bicycle frame. Accordingly, this bicycle hand driving device provides a mechanism which can be used with most any conventional bicycle, and can be quickly and easily removed from the bicycle when it is desired to pedal the bicycle with leg power only.

Therefore, it is an object of the present invention to provide an improved hand driving device for a bicycle which can be quickly and easily fit to any new or existing bicycle.

It is another object of the present invention to provide a hand driving device for a bicycle which will transmit the power of the bicycle rider's hands and arms to the bicycle crank to augment the bicycle rider's leg power in moving the bike.

It is still another object of the present invention to provide a hand driving device for a bicycle which can be used for exercising the bicycle rider's upper body while transporting the bicycle rider to his or her intended destination.

An additional object of the present invention is to provide a hand driving device for a bicycle which is inexpensive to manufacture, durable in structure, efficient in operation, and will require little maintenance.

Still another object of the present invention is to provide an apparatus for hand driving a bicycle which can be used with a single hand, or with both hands in unison to power the bicycle.

These and other objects, features, and advantages of the present invention will become apparent from the following descriptions when considered in conjunction with the accompanying drawings wherein like characters of reference designate corresponding parts throughout the several views.

DETAILED DESCRIPTION OF THE PREFERRED EMBODIMENT

FIG. 5 is a perspective view of the T-shaped bracket of the hand driving device illustrated in FIG. 1.

FIG. 6 is a perspective view of a fastening plate of the hand driving device illustrated in FIG. 1.

FIG. 7 is a perspective view the fasteners used to fasten the hand driving device together.

FIG. 8 is a perspective view of the fastener used to fasten the pivoted lever to the T-shaped bracket.

FIG. 9 is a perspective view of the fasteners used to fasten the fastening plates of the invention together;

FIG. 10 is a perspective view of a pedal level fastener; and

FIG. 11 is a perspective view of the pedal connecting rod and pedal connecting rod fastener placed over the axial shaft of a bicycle pedal.

DETAILED DESCRIPTION

Figure 1:
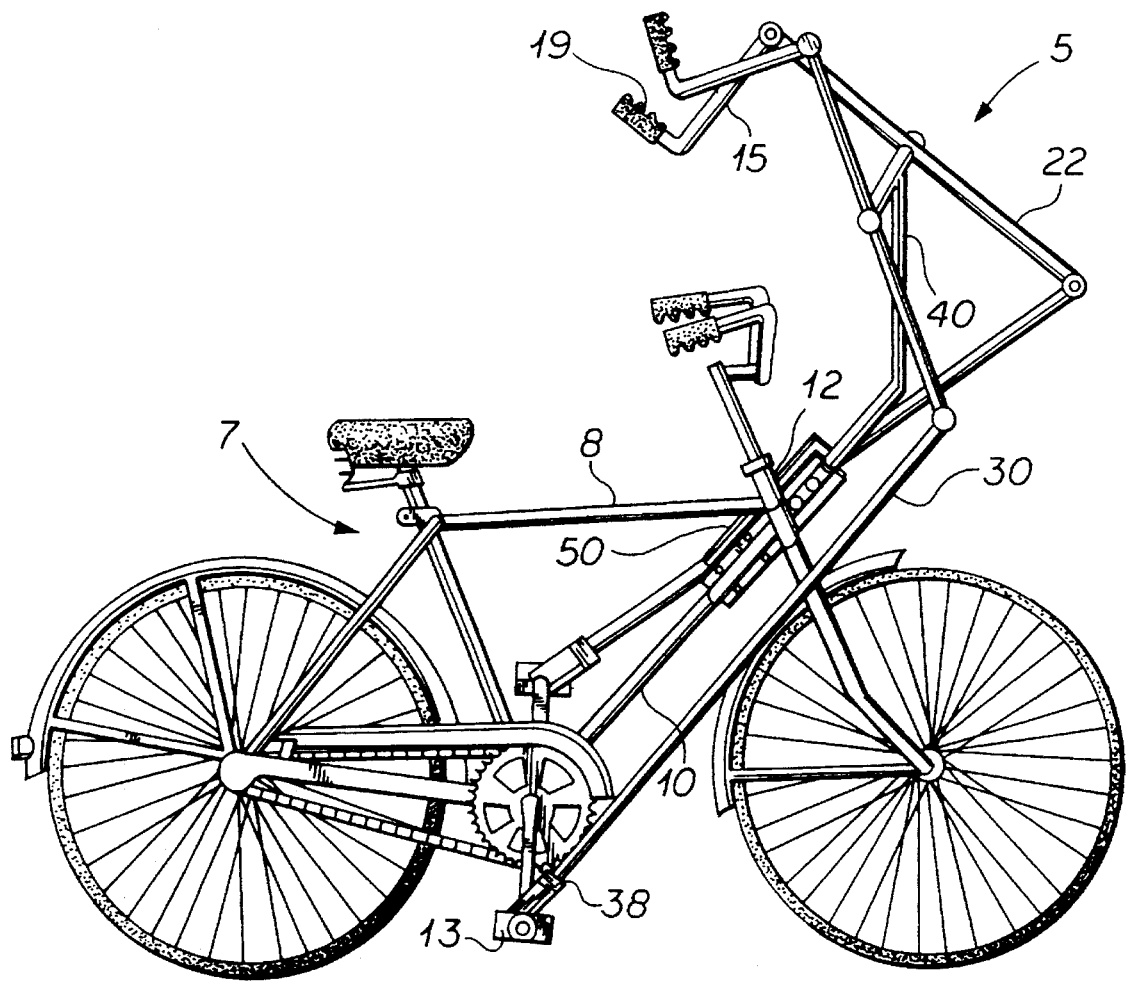
FIG. 1 is a side elevational view in partial perspective of a hand driving device for a bicycle constructed in accordance with the present invention.

Referring now in detail to the drawings, numeral 5 of FIG. 1 illustrates a preferred embodiment of the hand driving device for a bicycle. Hand driving device 5 is attached to a conventional bicycle 7 having a frame 8, an inclined frame member 10, a steering head or steering hub 12, as well as a foot crank mechanism that is rotatably attached to frame 8, and pedals 13 that are rotatably connected to the foot crank mechanism, each pedal including an axial shaft 14 formed centrally therethrough.

Referring now to FIG. 1, hand driving device 5 includes a pair of spaced apart handle levers 15, a pair of spaced apart pivoted levers 22, a pair of spaced apart pedal connecting rods 30, and a pair of pedal connecting rod fasteners 38 slidably mounted on the ends of each pedal connecting rod 30. Hand driving device 5 also includes a T-shaped bracket 40 which is fastened to frame 8 and steering hub 12 of bicycle 7 by a pair of opposed fastening plates 50.

Figure 2:
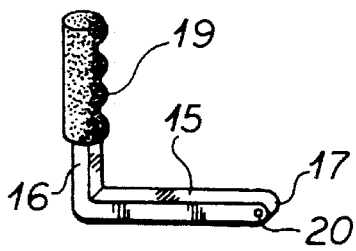
FIG. 2 is a perspective view of a handle lever of the hand driving device illustrated in FIG. 1.

Handle lever 15 is best illustrated in FIG. 2. Hand lever 15 has a first end 16 and a second end 17. As shown, first end 16 of handle lever 15 is turned upward at a 90° angle from second end 17 so that handle 19 on first end 16 is generally perpendicular to second end 17 of the handle lever. Hole 20 is defined at the second end 17 of handle lever 15, and passes therethrough for pivotally connecting handle lever 15 to pivoted lever 22.

Figure 3:
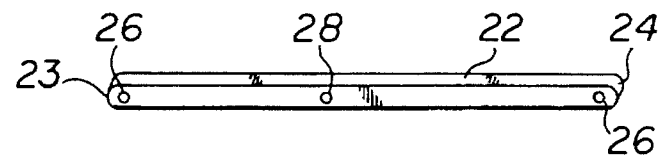
FIG. 3 is a perspective view of a pivoted lever of the hand driving device illustrated in FIG. 1.

Pivoted lever 22 is illustrated in FIG. 3. Pivoted lever 22 is an elongated bar or rod, having a first end 23 and a second end 24. A pair of identical holes 26 are formed, one at each end of the pivoted lever. Each hole 26 passes through the first and second ends of pivoted lever 22, respectively. Pivoted lever 22 is also provided with a pivot hole 28 located intermediate ends 23 and 24 of pivoted lever 22. As shown in FIG. 3, pivot hole 28 is shown at the center of the pivoted lever. However, it is anticipated that pivot hole 28 can be located elsewhere along the length of pivoted lever 22 in order to increase or decrease the lever action effect of hand driving device 5 while in use on bicycle 7.

Figure 4:
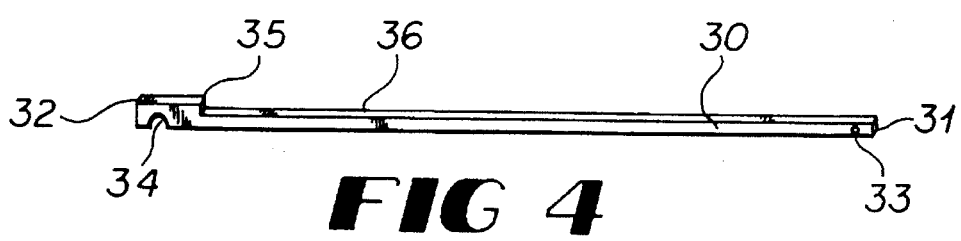
FIG. 4 is a perspective view of a pedal connecting rod of the hand driving device illustrated in FIG. 1.

Referring now to FIG. 4, a pedal connecting rod 30 is illustrated. Pedal connecting rod 30, like pivoted lever 22, is an elongated bar or rod having a first end 31 and a second end 32. A hole 33 is defined at first end 31 of the pedal connecting rod, and passes completely therethrough. Second end 32 of pedal connecting rod 30 has an arcuate notch 34 defined therein which is sized and shaped to fit over the axial shaft 14 of bicycle pedal 13 (FIG. 11). Pedal connecting rod 30 also has a stop 35 formed at second end 32. Stop 35 has the same width as pedal connecting rod 30. However, stop 35 is raised above top surface 36 of pedal connecting rod 30 so that it acts both as a stop and as a positioning device for locating pedal level fastener 38 in proper position on pedal connecting rod 30. The height of stop 35 above top surface 36 of pedal connecting rod 30 corresponds to the height of case section 74 of pedal connecting rod fastener 38, as discussed in greater detail below.

T-shaped bracket 40 of hand driving device 5 is illustrated in FIG. 5. T-shaped bracket 40 has a first end 41, and a second end 42. First end 41 of the T-shaped bracket is constructed of a circular tube or bar and has a horizontal section 44 of a width sufficient to hold and space apart each of pivoted levers 22 above and in fixed spatial relationship to frame 8 of bicycle 7. Additionally, the width of horizontal section 44 will be established in conjunction with the width of the bicycle crank assembly so that pedal connecting rods 30 are correctly spaced apart so as to be placed on each axial shaft 14 for each pedal of the bicycle crank assembly, as illustrated in FIG. 11. A vertical section 47 is connected to the center of horizontal section 44, and extends downward toward an inclined section 48. Inclined section 48 has two holes 49 for receiving fasteners 66 and 68 which hold T-shaped bracket 40 to fastening plates 50. Each of holes 49 extends through second end 42 of T-shaped bracket 40.

Fastening plates 50 which secure T-shaped bracket 40, and thus secure hand driving device 5 to bicycle 7, are illustrated in both FIG. 1 and FIG. 6. Referring first to FIG. 6, a fastening plate 50 is illustrated having a first end 51 and a second end 52. Intermediate the first and second ends of fastening plate 50 is an arcuate section 54 which is oriented in a generally oblique position with regard to the horizontal length of fastening plate 50. A ridged section 56 is located along the horizontal and longitudinal axis of fastening plate 50, and is sized and shaped to be received on inclined frame member 10 of bicycle frame 8. Similarly, arcuate section 54 is sized and shaped to be received on steering head 12 of bicycle frame 8. Still referring to FIG. 6, fastening plate 50 has six holes 58 defined therein and passing therethrough for receiving fasteners 66 and 68 for connecting fastening plate 50 to a parallel, spaced apart, and opposed or mirror image fastening plate 50 on each side of inclined frame member 10 of bicycle 7. Fastening plates 50 (FIG. 1) sandwich inclined frame member 10 between each fastening plate 50, while arcuate section 54 sandwiches steering hub 12 of the bicycle frame. The two holes 58 located at the second end 52 of fastening plate 50 are for receiving fasteners 66 and 68 (FIG. 9) for securing T-shaped bracket 40 to each of fastening plates 50, and thus to bicycle 7.

Referring now to FIG. 1, as installed each of fastening plates 50 will be connected to the other along and about inclined frame member 10 and steering hub 12, and are inclined upward in the same direction as inclined frame member 10 for receiving second end 42 of T-shaped bracket 40. Although fastening plate 50 is shown as having a straight longitudinal axis with a first and second end 51 and 52, respectively, it is anticipated that fastening plate 50 could be inclined upward from arcuate section 54 toward second end 52 if it is desired to provide a T-shaped bracket 40 which does not have an inclined section 48 as shown in FIGS. 1 and 5. For ease of fabrication, however, fastening plate 50 is shown as having a straight longitudinal axis.

Referring now to FIG. 7, fasteners 60 and 62 are illustrated. Fastener 60 is a conventional bolt, and fastener 62 is a conventional nut. A single bolt 60 and a single nut 62 is provided for each of holes 20, 26, and 33 in handle lever 15, pivoted lever 22, and pedal connecting rod 30, respectively, for pivotally connecting each of the levers together. Although it is not illustrated, it is anticipated that each fastener 60 and 62 would also be provided with a lockwasher so that once nut 62 has been threaded onto bolt 60, it is held in position so that the fasteners form a pivotal connection at the connection point of each lever to the other, respectively. That portion of bolt 60 fitted within hole 20, 26, or 33 will have a smooth bearing surface for the pivotal connection.

Similarly, in FIG. 8, fastener 64 is illustrated for use with T-shaped bracket 40. A bolt 64 will be provided for each of pivot holes 28 in pivoted levers 22, and will be received in each of the T-shaped bracket's threaded holes 45. Bolt 64 will be threaded into each of threaded holes 45, so as to form a pivotal connection between pivoted lever 30 and T-shaped bracket 40.

In like fashion, FIG. 9 illustrates fasteners 66 and 68 for use in connecting each of fastening plates 50 to the other, and for connecting T-shaped bracket 40 to fastening plates 50. Fastener 66 is a conventional bolt, and fastener 68 is a conventional nut. As with fasteners 60 and 62, fasteners 66 and 68 will be provided with a lockwasher so that once each of nuts 68 has been threaded onto bolt 66, the nuts will not back off of the bolt, thus forming a rigid connection for each of fastening plates 50 on inclined frame member 10 and steering head 12, and for T-shaped bracket 40 to fastening plates 50.

Pedal connected rod fastener 38 is illustrated in FIG. 10. Pedal connecting rod fastener 38 has a first end 71 and a second end 72. First end 71 has a generally horizontal and rectangular case section 74 formed thereon, the case section having a generally rectangular passage 75 defined therein and passing therethrough sized and shaped to accommodate, and to be passed over, first end 31 of pedal connecting rod 30 so that as pedal connecting rod fastener 38 travels along the length of pedal connecting rod 30 it will proceed down the length of the rod until such time as case section 74 is resting on stop 35 formed at second end 32 of the rod. Extending between first end 71 and second end 72 of the pedal connecting rod fastener is a wing section 76 which will act as the closure shield about axial shaft 14 of pedal 13 once the shaft has been received within arcuate notch 34 defined in the second end 32 of pedal connecting rod 30. In this manner, pedal connecting rod fastener 38 will securely hold each of pedal axles 14 within each of notches 34 formed in each of pedal connecting rods 30. However, a feature of this invention is that pedal level fastener 38 can be moved forward toward first end 31 of the pedal connecting rod, so that notch section 34 can be lifted off of pedal axle 14 for quickly and easily removing hand driving device 5 from bicycle 7. Of course, T-shaped bracket 40 will also have to be removed from fastening plates 50 to remove device 5 from the bicycle.

Still referring to FIG. 10, case section 74 is sized and shaped so that its height corresponds to the height of stop 35 formed at second end 32 of pedal connecting rod 30. This is illustrated in greater detail in FIG. 11. Passage 75 defined within case section 74 is of a width slightly greater, and a height slightly greater, than the height and width of pedal connecting rod 30 so that pedal level fastener 38 can be quickly passed over and along each of pedal connecting rods 30 toward second end 32 of the pedal connecting rod.

To assemble hand driving device 5, nut 62 is threaded onto a bolt 60 passed through hole 20 of handle lever 15 to pivotally connect it to hole 26 at the first end 23 of pivoted lever 22. Next, a bolt 60 is passed through hole 26 defined at the second end 24 of pivoted lever 22, as well as through hole 33 defined at first end 31 at pedal connecting rod 30. A nut 62 is then threaded on bolt 60 to pivotally connect pivoted lever 22 to a pedal connecting rod 30. However, before pedal connecting rod 30 and pivoted lever 22 are connected, pedal connecting rod fastener 38 has been placed over the first end of pedal connecting rod 30 and passed down toward second end 32 of the pedal connecting rod. Once the levers are connected to each other, a T-shaped bracket bolt 64 is placed through pivot hole 28 located intermediate the ends of pivoted lever 22, and threaded into one of threaded holes 45 of horizontal section 44 of the T-shaped bracket. However, before each of the pivoted levers is attached to T-shaped bracket 40, each of fastening plates 50 is placed along inclined frame member 10 and in registry with steering head 12, and bolted together using fasteners 66 and 68. T-shaped bracket 40 is then bolted onto fastening plates 50 by placing fasteners 66 and 68 through each one of holes 49 in the second end 42 of the T-shaped bracket 40. Arcuate notch 34 of each pedal connecting rod 30 is then placed over each axial shaft 14, and pedal connection rod fasteners 38 are moved into contact with stops 35 so that the fastener encloses axial shaft 14 within the second end 32 of each rod 30.

When it is desired to remove hand driving device 5 from the bicycle, pedal level fastener 38 need only be moved toward first end 31 of pedal connecting rod 30, and the pedal connecting rod lifted off of pedal axle 14, and only two bolts and two nuts need be removed from holes 49 of T-shaped bracket 40 to remove the T-shaped bracket, and thus the entire hand driving device 5 from bicycle 7.

Handle lever 15, pivoted lever 22, pedal connecting rod 30, and T-shaped bracket 40 are formed of conventional steel bar or tube members. As illustrated in FIG. 1, each of these levers is constructed of a hollow steel or metallic tube with a cross-section of sufficient thickness to resist any torsional bending within the levers as hand driving device 5 is used on the bicycle. Although solid bars or rods could be used in lieu of hollow tubing, this would increase the weight of the hand driving device, and thus the weight of bicycle 7 as the bicycle rider is attempting to power the bicycle forward. Fastening plate 50 will be constructed of steel or a metallic compound, and will be of sufficient thickness so that as fastening plates 50 are connected to bicycle 7 along inclined frame member 10, the fastening plates 50 will not deform as they are being connected to each other by fasteners 66 and 68. Pedal level fastener 38 will similarly be constructed of steel or a metallic casting. Fasteners 60, 62, 64, 66, and 68 are conventional fasteners. Lastly, upstanding handle 19 on first end 16 on handle lever 15 can be constructed of rubber, neoprene, foam rubber, or of any suitable material sufficient to provide a cushioned gripping surface on first end 16 of handle lever 15.

Having thus described the construction and method of mounting my hand driving device to a bicycle, the operation of the hand driving device is now described by reference to FIG. 1. A bicycle rider (not illustrated) will utilized hand driving device 5 while seated on bicycle 7. The feet of the bicycle rider will be placed on pedals 13 in conventional fashion.

Thereafter, the bicycle rider can either grasp the handle bars of the bicycle, or will grasp each of handles 19 positioned at the end of each of handle levers 15. Movement of the bicycle is then started by either applying foot pressure to pedals 13 and/or by applying a pulling force to handles 19. Handle levers 15 and handles 19 will be used to steer the bike when the hand driving device is being used. Thereafter, the bicycle can be propelled by the combination of hand power and foot power, by hand power alone, or by foot power alone. Moreover, since hand driving device 5 is constructed to be removable, it is anticipated that the hand driving device could be removed from bicycle 7 altogether when bicycle 7 is used without hand driving device 5, as none of the device remains on the bicycle with the exception of fastening plates 50 which are left to receive T-shaped bracket 40 at the time that hand driving device 5 is placed back on the bicycle for use.

It will be obvious to those skilled in the art that many variations can be made in the embodiment chosen here for the purposes of disclosing my invention, without departing from the scope thereof as defined by the appended claims.

I claim:

1. A removable hand driving device for a bicycle, the bicycle having a frame including an inclined frame member connected to a steering head, a foot crank mechanism that is rotatably attached to the frame, and pedals that are each rotatably connected to the foot crank mechanism, each pedal including an axial shaft formed centrally therethrough, said device comprising:

lever means for transmitting the arm motion of a bicycle rider to the pedals of the bicycle, bracket means, for supporting said lever means on the bicycle frame;

means for removably fastening said bracket means to the bicycle frame; and means for removably fastening said lever means to the axial shaft of each bicycle pedal;

whereby said lever means of the driving device is moved by the bicycle rider's hands and arms and the motion of said lever means is transmitted through said driving device to the foot crank mechanism of the bicycle to help power the movement of the bicycle.

2. The device of claim 1, wherein said lever means further comprises:

a pair of handle levers, each handle lever having a first end and a second end;

a pair of pivoted levers, each pivoted lever having a first end and a second end;

a pair of pedal connecting rods, each pedal connecting rod having a first end and a second end;

wherein the second end of each of said handle levers is pivotally connected to the first end of each of said pivoted levers, and the second end of each of said pivoted levers is pivotally connected to the first end of said pedal connecting rods, and the second end of each of said pedal connecting rods is sized and shaped to be supported on the axial shaft of each bicycle pedal.

3. The device of claim 2, wherein each of said pivoted levers is pivotally connected at a point intermediate its ends to said bracket means so that each of said pivoted levers pivots thereon.

4. The device of claim 2, wherein said means for removably fastening said lever means to the axial shaft of each bicycle pedal comprises:

an arcuate notch formed in the second end of each of said pedal connecting rods adapted to be pivotally received on the axial shaft of the bicycle pedal;

a pedal connecting rod fastener;

a stop formed at the second end of said pedal connecting rod for positioning said pedal connecting rod fastener with respect to said notch and the axial shaft of the bicycle pedal;

wherein said pedal connecting rod fastener is adapted to enclose the axial shaft of the bicycle pedal within said notch in said second end of each of said pedal connecting rods so that said pedal connecting rod and the bicycle pedal move together.

5. The device of claim 1, wherein said means for removably fastening said bracket means to the bicycle frame further comprises:

a pair of opposed fastening plates, said fastening plates being parallel to and spaced apart from one another, wherein each of said plates has a first end and a second end, the first end of each of said fastening plates being sized and shaped to be placed along and on opposite sides of the inclined frame member of the bicycle, and wherein each of said fastening plates has a generally oblique arcuate section formed with respect to the length of said fastening plate, said arcuate section being formed intermediate the ends thereof;

wherein said bracket means is connected to the second end of each of said fastening plates;

threaded fastener means for fastening each of said fastening plates to the other about the bicycle frame and steering head; and threaded fastener means for connecting said bracket means to said fastening plates.

6. A hand driving device for a bicycle, the bicycle having a frame including an inclined frame member connected to a steering head, a foot crank mechanism that is rotatably attached to the frame, and pedals that are each rotatably connected to the foot crank mechanism, each pedal including an axial shaft formed centrally therethrough, said device comprising:

a pair of spaced apart handle levers, each handle lever having a first end and a second end;

a pair of spaced apart pivoted levers, each pivoted lever having a first end and a second end;

a pair of spaced apart pedal connecting rods, each pedal connecting rod having a first end and a second end;

a T-shaped bracket sized and shaped to be removably fastened to the bicycle frame;

pedal connecting rod fastener means for pivotally supporting the second end of one each of said pedal connecting rods on one each of the axial shafts of the bicycle pedals;

wherein the second end of each of said handle levers is pivotally connected to the first end of each of said pivoted levers, the second end of each of said pivoted levers is pivotally connected to the first end of each of said pedal connecting rods, and each of said pivoted levers is pivotally connected intermediate its ends to said T-shaped bracket and held in a fixed spatial relationship with respect to one another.

7. The device of claim 6, wherein said pedal connecting rod fastener means for each of said pedal connecting rods comprises:

a generally arcuate notch formed in the second end of said pedal connecting rod adapted to pivotally support said pedal connecting rod on the axial shaft of the bicycle pedal;

a stop defined at the second end of said pedal connecting rod with respect to said notch;

a pedal connecting rod fastener having a first end and a second end, wherein said first end includes a generally rectangular case section having a hollow passage defined therein and passing therethrough adapted to be passed over the first end of said pedal connecting rod toward the second end of said rod, and wherein said pedal connecting rod fastener has an elongated wing section extending from said case section toward the second end of said fastener, wherein said fastener is passed over the first end of the pedal connecting rod and rests against said stop so that said wing section closes said notch.

8. The device of claim 6, wherein said T-shaped bracket is sized and shaped to be mounted on the bicycle by a pair of spaced apart and parallel fastening plates, each of said plates having a first end and a second end, wherein the first end of each of said fastening plates is sized and shaped to be received on the inclined frame member and steering head of the bicycle, and wherein the second end of each of said fastening plates is sized and shaped to removably receive said T-shaped bracket.

9. A method of attaching a hand driving device to a bicycle, the bicycle having a frame including an inclined frame member connected to a steering head, a foot crank mechanism rotatably attached to the frame, and two bicycle pedals that are each rotatably connected to the foot crank mechanism, each pedal including an axial shaft formed centrally therethrough, comprising the steps of:

attaching a pair of spaced apart fastening plates to the inclined frame member and steering head of the bicycle frame;

attaching a T-shaped bracket to said connecting plates;

pivotally attaching lever means to said T-shaped bracket, wherein said lever means includes a pair of elongated pedal connecting rods;

fastening said lever means to the axial shafts of the bicycle pedals by enclosing the axial shaft of one each of said bicycle pedals in an arcuate notch defined in the end of one each of the pedal connecting rods and by passing a pedal connecting rod fastener over the pedal connecting rod and sliding the pedal connecting rod fastener along the length of said rod toward the end of the pedal connecting rod placed over the axial shaft of the bicycle pedal; and holding said pedal connecting rod fastener at the end of said pedal connecting rod by stop means formed on the end of the pedal connecting rod so that said pedal connecting rod fastener is held in a fixed position with respect to said notch formed in said pedal connecting rod.

10. A hand driving device for a bicycle, the bicycle having a frame including an inclined frame member connected to a steering head, a foot crank mechanism that is rotatably attached to the frame, and pedals that are each rotatably connected to the foot crank mechanism, each pedal including an axial shaft formed centrally therethrough, said device comprising:

lever means for transmitting the arm motion of a bicycle rider to the pedals of the bicycle, said lever means including a pair of handle levers, each handle lever having a first end and a second end, a pair of pivoted levers, each pivoted lever having a first end and a second end, a pair of pedal connecting rods, each pedal connecting rod having a first end and a second end, wherein the second end of each of said handle levers is pivotally connected to the first end of each of said pivoted levers, and the second end of each of said pivoted levers is pivotally connected to the first end of said pedal connecting rods, and the second end of each of said pedal connecting rods is sized and shaped to be supported on the axial shaft of each bicycle pedal;

bracket means for supporting said lever means on the bicycle frame;

means for fastening said bracket means to the bicycle frame; and means for fastening said lever means to the axial shaft of each bicycle pedal.

* * * * *